United States Patent
Anderson et al.

(10) Patent No.: US 6,804,337 B1
(45) Date of Patent: Oct. 12, 2004

(54) BILL IMAGE GENERATION

(75) Inventors: Samuel Anderson, Co. Antrim (GB); Stephen Brankin, Co. Antrim (GB); Edward Millsopp, Co. Down (GB); Angela Rose Canavan, Belfast (GB); Nicholas Orr, Co.Antrim (GB); William J Gault, Co.Antrim (GB)

(73) Assignee: British Telecommunications plc, London (GB)

( * ) Notice: Subject to any disclaimer, the term of this patent is extended or adjusted under 35 U.S.C. 154(b) by 0 days.

(21) Appl. No.: 09/914,291
(22) PCT Filed: Mar. 22, 2000
(86) PCT No.: PCT/GB00/01084
§ 371 (c)(1), (2), (4) Date: Aug. 27, 2001
(87) PCT Pub. No.: WO00/59199
PCT Pub. Date: Oct. 5, 2000

(30) Foreign Application Priority Data

Mar. 25, 1999 (GB) .............................................. 9906970

(51) Int. Cl.$^7$ ............................................ H04M 15/00
(52) U.S. Cl. ............................. 379/114.06; 379/114.01; 379/114.03; 379/114.1; 379/114.12; 455/406
(58) Field of Search ....................... 379/112.01, 114.01, 379/114.03, 114.04, 114.05, 114.06, 114.09, 114.1, 114.12, 114.28, 115.01, 116, 119, 121.01, 121.02, 121.05, 126, 133; 455/405, 406, 408

(56) References Cited

U.S. PATENT DOCUMENTS 5,793,852 A * 8/1998 Kang et al. ............ 379/115.01

FOREIGN PATENT DOCUMENTS

| WO | WO 95/24094 | * | 9/1995 | .......... H04M/15/12 |
| WO | WO 97/05734 | * | 2/1997 | .......... H04M/15/00 |

* cited by examiner

*Primary Examiner*—Quoc D Tran
(74) *Attorney, Agent, or Firm*—Nixon & Vanderhye PC

(57) ABSTRACT

A method and apparatus for generating a bill image in a computer implemented billing system for a telecommunications network which includes providing a plurality of discounts for a customer retroactively applied to calls made during a billing period in which the discounts apply. The method includes loading qualification criteria for the plurality of discounts and customer account details into the billing system, generating a data structure defining a time line over at least part of which the discounts are operative, the time line being divided in dependence on the qualification criteria and customer account details into a number of segments each of which corresponds to a period during which a respective version of the discounts were operative, accumulating charges for the calls made during each segment, and calculating the appropriate discounts from the accumulated charges for each segment for calls which qualify for the discounts.

13 Claims, 11 Drawing Sheets

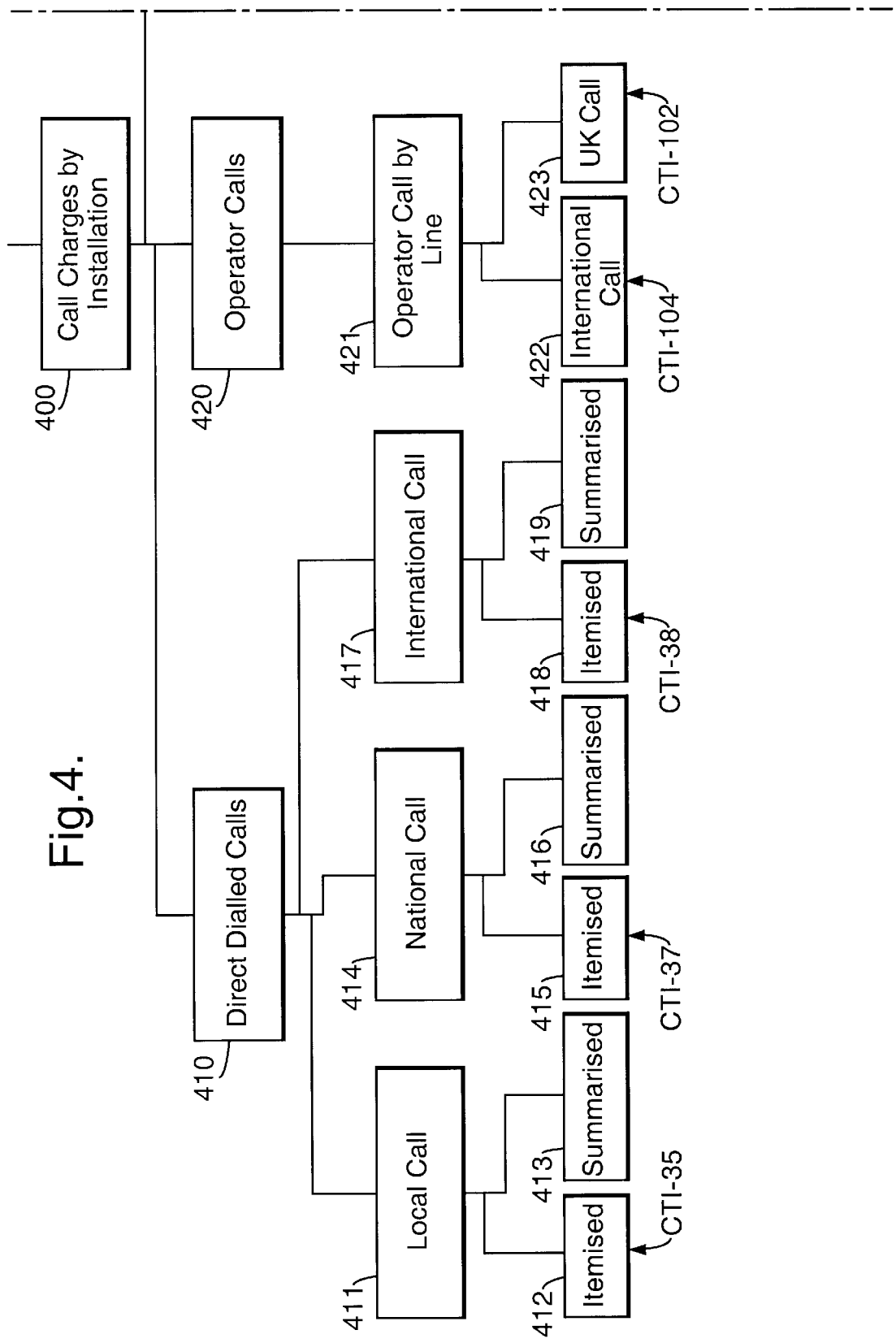

Fig.5a.

Section 400 header
  Section 410 header
    Section 411 header
      Section 412 header
      Record

Fig.5b.

Section 400 header
  Section 410 header
    Section 411 header
      Section 412 header
      Record
      Record

Fig.5c.

Section 400 header
  Section 410 header
    Section 411 header
      Section 412 header
        Record
        Record
        Section 412 footer
      Section 411 footer
    Section 414 header
      Section 415 header
        Record

Fig.5d.

```
Section 400 header
    Section 410 header
        Section 411 header
            Section 412 header
                Record
                Record
            Section 412 footer
        Section 411 footer
        Section 414 header
            Section 415 header
                Record
            Section 415 footer
        Section 414 footer
    Section 410 footer
    Section 430 header
        Section 435 header
            Section 436 header
                Record
```

Fig.5e.

```
Section 400 header
    Section 410 header
        Section 411 header
            Section 412 header
                Record
                Record
            Section 412 footer
        Section 411 footer
        Section 414 header
            Section 415 header
                Record
            Section 415 footer
        Section 414 footer
    Section 410 footer
    Section 430 header
        Section 435 header
            Section 436 header
                Record
            Section 436 footer
        Section 435 footer
    Section 430 footer
Section 400 footer
```

BILL IMAGE GENERATION

FIELD OF THE INVENTION

The present invention relates to a method of generating a bill image and also to a computer-implemented billing system.

BACKGROUND TO THE INVENTION

As telecommunications technologies advance, the number of service types available to the customer from telecommunications suppliers is increasing dramatically. A private customer may have a standard telephone line, a cardphone account and possibly access to network facilities such as call minding and 3-way calling, all of which may have to be billed to a single account. A business customer may have many more services such as ISDN, permanent leased data connections, or multiple lines connected to a single number. Each service type to be charged needs to be clearly and logically laid out on the printed bill so that the customer can easily determine what he is being charged for.

With the deregulation of the telecommunications industry and subsequent competition it has brought a large number of charging systems, discounting options and other offers to attract customers and compete with other telecommunications suppliers has introduced the need for further levels of detail in bills so the customer can readily appreciate the savings made.

A number of different discounting products or schemes may need to be supported. These may be introduced as promotions to all or selected customers, sold as a product to a customer or subject to the customer requesting to join the scheme. Examples of discounting products marketed by British Telecommunications public limited company include discounted Saturday calls, PremierLine and Friends & Family. A further discounting product offered, particularly to business users, is volume threshold discounting.

Typically, one of the problems in introducing new discounting products or changes to a discounting product is the time taken to implement appropriate changes to the computer software used to process customer usage records to determine whether they are eligible for a discount and then to determine the discount. A new discounting product to be offered, an alteration to the discount rate or eligibility criteria, or any other similar amendment requires program code to be updated or otherwise rewritten, sometimes at great expense. It is desirable to provide a bill processing system that provides a more flexible discounting system.

EP-A-809387 discloses a system for rating and billing telecommunications transactions in real-time. A so-called real-time analysis engine (RAE) updates customers' bills in real-time by applying customer specific data (e.g. discount schemes) to automatic message accounting (AMA) records. An AMA record is generated for a call by a telecommunications switch and the record is passed to the RAE where the call is rated. The RAE then matches the rated call to the customer who initiated the call, locates the customer's billing data, and applies to the call any discounts to which the customer is entitled. After the call has been rated and discounted, or "priced", it can be added to the customer's other priced calls for the current billing period to generate a current bill for the customer. The RAE may also adjust charges for old calls to reflect certain types of billing plans. For example, a customer may receive a conditional 10% discount on all calls within a billing period provided that the customer exceeds $100 in total charges within the billing period. In such a case, calls will initially be billed at the full rate, until such time as the total charges reach $100. Thus, if the customer's charges do reach $100 before the end of the billing period, not only will subsequent calls need to be discounted by 10%, but all previous calls will need to be discounted by 10%. This is the only example of retrospective discounting, the specification otherwise being solely concerned with real-time pricing. There is no disclosure of accumulating charges by time segments and calculating appropriate discounts from the accumulated charge segments.

WO-A-9849825 describes a method of processing "call detailed records" (CDRs) which are used in the generation of bills. In the method, a graphical user interface is used to enable a user to select the data fields which are to be used to provide the data from which a bill is to be produced. Only such data as corresponds to the fields which have been selected will pass from the home telephone exchange to the billing centre. There is no reference to charge type identifiers, nor to the editing of bill images. Rather, the invention seems to be addressing problems of excess data (including blank fields) in a variety of formats being passed between telephone exchanges and billing centres; difficulties of adding or removing fields from CDRs; and the need for the suppliers of telephone exchange equipment to be notified as much as a year before installation of a telephone exchange of the format/field names, etc. which are to be used in the CDRs. Thus can be seen that the invention there set out is addressing a very different problem from the one addressed by the present invention.

In the paper "A graphical tool for bill design", BT Technology Journal, Vol 12, No 4. pp 85–91, 1994, Utton and Saunders, there is described a tool to support the design of telephone bills. The tool allows a bill designer to modify the layout of a bill graphically, using a graphical user interface, and to receive feedback from a knowledge base embodying typographical guidelines and operational system constraints. In this way, the tool is able provide decision support for the bill design process. The tool is also able to generate the formating parameters requires by the operational systems to implement revised bill designs.

Using the graphical user interface, a designer is able to edit an image of a bill. There is, however, no discussion of discounting schemes nor of how they might affect bill generation.

The paper "Multiservice billing system—a platform for the future", BT Technology Journal, Vol 14, No 3, pp 98–113, J Crookes gives an extensive overview of the complexities inherent in billing systems for a major telecommunications provider. It does not discuss the influence of discounting schemes on bill generation.

SUMMARY OF THE INVENTION

According to a first aspect of the present invention, a method of generating a bill image for a customer in a computer implemented billing system for a telecommunication network which includes discounts for a customer applied to calls during a billing period in which a plurality of discount schemes apply, include the steps of loading qualification criteria for the discount schemes and customer account details into the billing system, characterised in that the method further includes generation a data structure for each discount scheme, the data structures defining a time line over at least part of which the discount scheme was operative, the time line being divided in dependence on subscription to the discount scheme by the by customer and on changes to the discount scheme during the billing period into a number of segments each of which corresponds to a period during which a respective version of the discount scheme was operative, accumulating charges for the calls made during each segment, and subsequently calculating an appropriate discount from the accumulated charges for each segment for calls which qualify for a discount under the discount scheme.

Preferably, the step or accumulating the charges for the calls made during each segment includes accumulating the charges for calls made in each of a number of predetermined categories.

Preferably, the step of calculating the appropriate discount includes obtaining an appropriate discount rate associated with the respective version of the discount scheme for the predetermined category for which the charges have been accumulated and applying the discount rate to the accumulated charges.

Preferably, the step of generating the time line further includes the steps of determining date of the earliest made call of the calls made and, if the date falls before the start of the billing period, extending the billing period to include the date of the call.

Preferably, the method further includes the step of generating a discount usage record containing the calculated discount for use in the generation of the bill image.

According to a second aspect of the present invention, a computer implemented billing system includes at least one computer readable memory storing computer executable instructions for performing the method of the first aspect of the present invention.

According to a third aspect of the present invention, a computer implemented billing system is arranged to perform the following operations to generate a bill image which includes discounts for a customer applied to calls made during a billing period in which a plurality of discount schemes apply: generate a data structure for each discount scheme defining a time line over at least part of which the discount scheme was operative, the time line being divided in dependence on subscription to the discount scheme by the customer and on changes to the scheme during the billing period into a number of segments each of which corresponds to a period during which a respective version of the discount scheme was operative, accumulate charges for the calls made during each segment, and calculate an appropriate discount from the accumulated charges for each segment for calls which qualify for a discount under the discount scheme. In the present invention, in order to allow discounting products be applicable for part of a billing period, discounting products subscribed to by the customer and the dates on which they were active during the billing period are stored in a customer account database. The data in the customer account database is used to generate a line for each discounting product, the time line consisting of one or more segments. Each segment on the time line represents a period in which the discounting product was active and unchanged. Each segment is associated with a number of accumulators for storing of charges of usage records that qualify for the discounting product during the time period of the segment. The date of each usage record is compared with the time line data structure and if the date coincides with the period of one of the segments, the charge held in the usage record is added to the accumulator linked to that segment. Once all the usage records have been processed, discounts are calculated by obtaining the call types that qualify for the discount product and apply the correct discount rate to the sum stored in each accumulator of qualifying call types. For each discount calculated, a discount record is generated in which the discount and any other details necessary to display to the customer on their bill are stored.

The preferred example, hidden records relating to the discounting system are added to the electronic bill image which contain the data used to generate the products respective time line and a record for each product containing a copy of each segment and linked accumulators. This permits bill image to be subsequently disassembled and edited to correct any mistakes.

BRIEF DESCRIPTION OF THE DRAWINGS

Examples of the present invention will now be described in detail with reference to the accompanying drawings, in which:

FIGS. 5a to 5e illustrate the steps in generating a bill image from a set of usage records using the text map of FIG. 4;

FIG. 6 is a flow chart showing the processes of the bill generation system specific to applying discounts and the like;

DETAILED DESCRIPTION

Figure 1:
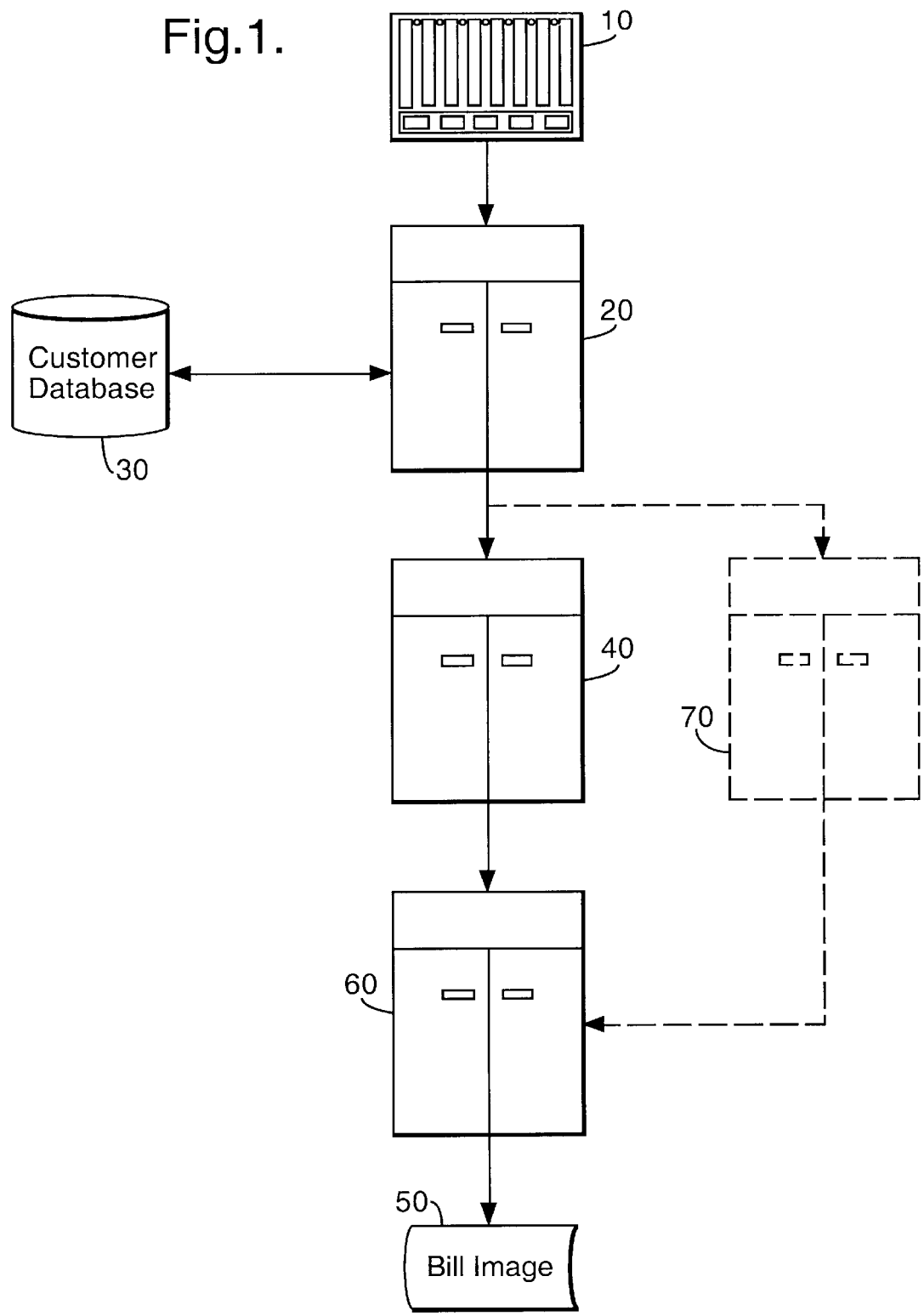
FIG. 1 is a functional block diagram of an example of an exchange forming part of a telecommunications network and bill generation system in accordance with the present invention.

In a telecommunications network, a service provider normally bills its customers on a regular monthly or quarterly basis. In the system shown in FIG. 1, for each call or use of a chargeable service made by a customer a usage record is produced in a telecommunications exchange 10. The usage records are transmitted, in batches, to a pricing system 20. Each usage record is priced according to the provider's current scale of charges and stored in a data store 30 in a file associated with the customer. At a predetermined billing date, the contents of the customer's file in the database 30 are processed by a bill processing system 40. The billing system processes each usage record in sequence to determine which service type it relates to, for example long distance, chargecard calls or operator services, and the records are then sorted into groups according to service type and fed into a bill generator 60.

The bill generator outputs each group of sorted records and any necessary headers and footers for that service as an electronic bill image 50. The bill generator 60 has an ordered list of service types which corresponds to the order into which the records are pre-grouped. Each element in the list is associated with text headers and footers that will appear on the printed bill. For each group of sorted records, the bill generator 60 compares the service type of the records to that which it is expecting in its list. If these match then the associated headers and footers are outputted. Otherwise the bill generator 60 moves onto the next service in its list.

In order to accommodate variable charging, discounting and other such offers, the system shown in FIG. 1 is arranged so that in addition to sorting the usage records according to service type, they are also processed by a discounting engine 70 which sorts the usage records into groups according to service type and also according to whether they qualify for discounts. A discount is calculated from those records that qualify which is then applied to the charge produced by the bill processing system 40.

In FIG. 1, the pricing system 20 may be implemented by one computer, whilst the bill processing system 40, bill generator 60, and the discounting engine 70 may be implemented by another computer. Each computer is of a well known construction and comprises a central processing unit, a store in the form of a random access memory, a read only memory and a hard disk, a visual display unit, a keyboard and input and output ports. The programs for controlling the operation of the computer are held in the store.

Figure 2:
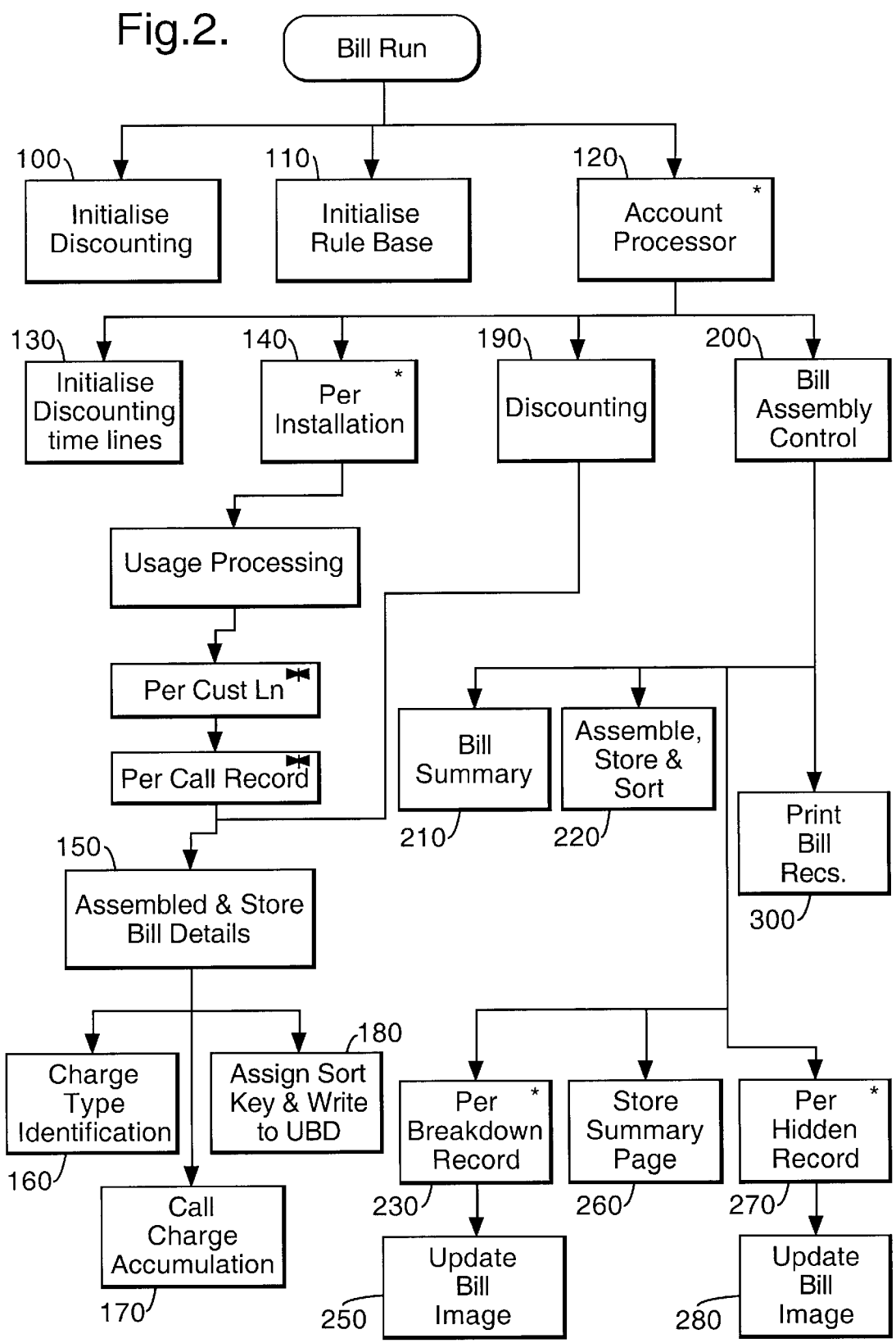
FIG. 2 is a tree showing the processing flow of the bill generation system of FIG. 1.

FIG. 2 is a tree showing an example of the information processing flow of a bill generation system in accordance with the present invention. The tree should be read from top to bottom and left to right. An asterisk (*) in a block indicates that the process of the block is repeated a number of times.

In the same manner as the system described above with reference to FIG. 1, each call or use of a chargeable service made by a customer generates a usage record which is priced and stored in a data store in a file associated with the customer. At the predetermined billing date, the bill generation system is run. Initialisation processes 100 and 110 are performed to respectively initialise discounting modules of the system and load from an external database a series of data processing rules and tables used by the system.

In process 120, an account processor prepares a bill for each customer to be billed on that date. In process 130, a number of time lines are created for use in determining any discounts from discounting products which are applicable to the customer over the period to be billed. A number of accumulators are also created and associated with the time lines for summing charges for subsequent use in calculating discounts. Each accumulator may relate to a chargeable service type such as direct-dialled calls. For each customer installation the records stored in the data store 30 associated with the customer are processed firstly by customer telephone line and then by usage record in process 140. For each usage record, billing details are assembled and stored in process 150 by assigning a charge type identifier (CTI) to the usage record in process 160. As part of the bill assembly, a running total of charges for those records processed is kept in process 170, in addition to accumulating the charges in the accumulators created in process 130. A sort key is assigned to the usage record which is then stored in an unsorted bill details (UBD) database in process 180.

A discounting engine processes the filled accumulators in process 190 to determine, according to the discounting products initialised in process 130, whether any discounts should be given. Each discounting product applicable to the customer may generate one or more discount records which are also passed to processes 150 to 180 to have a CTI and sort key assigned and to be added to the UBD.

Once all the usage records have been processed and applicable discounts have been determined, the bill assembly control process 200 is called. This produces a bill summary according to the summed call charges less any applicable discounts in process 210. In process 220 the UBD are sorted using the assigned sort keys to produce a list of sorted bill details which is stored in a sorted bill details (SBD) database. The SBD is then passed to a bill generator 60 which parses the SBD and generates an electronic bill image containing the records of the SBD and any other appropriate information that should appear on the bill. A bill image is a representation of a bill and is stored in a database from which the bill can be printed. For each subset of records of the SBD, such as international direct dialled calls, a breakdown listing and/or a total charge in addition to explanatory text in the form of headers and/or footers for that subset is produced by processes 230 and 250 and added to the bill image in the appropriate position. The bill summary generated by process 210 is added to the bill image in process 260. Finally, a number of hidden records are added to the bill image by processes 270 and 280 enabling a user of the system to regenerate discounting time lines, accounting details and other data specific to the customer at the date the bill image was created without reference to any other data. Process 300 then prints the bill image to be sent out to the customer.

Figure 3:
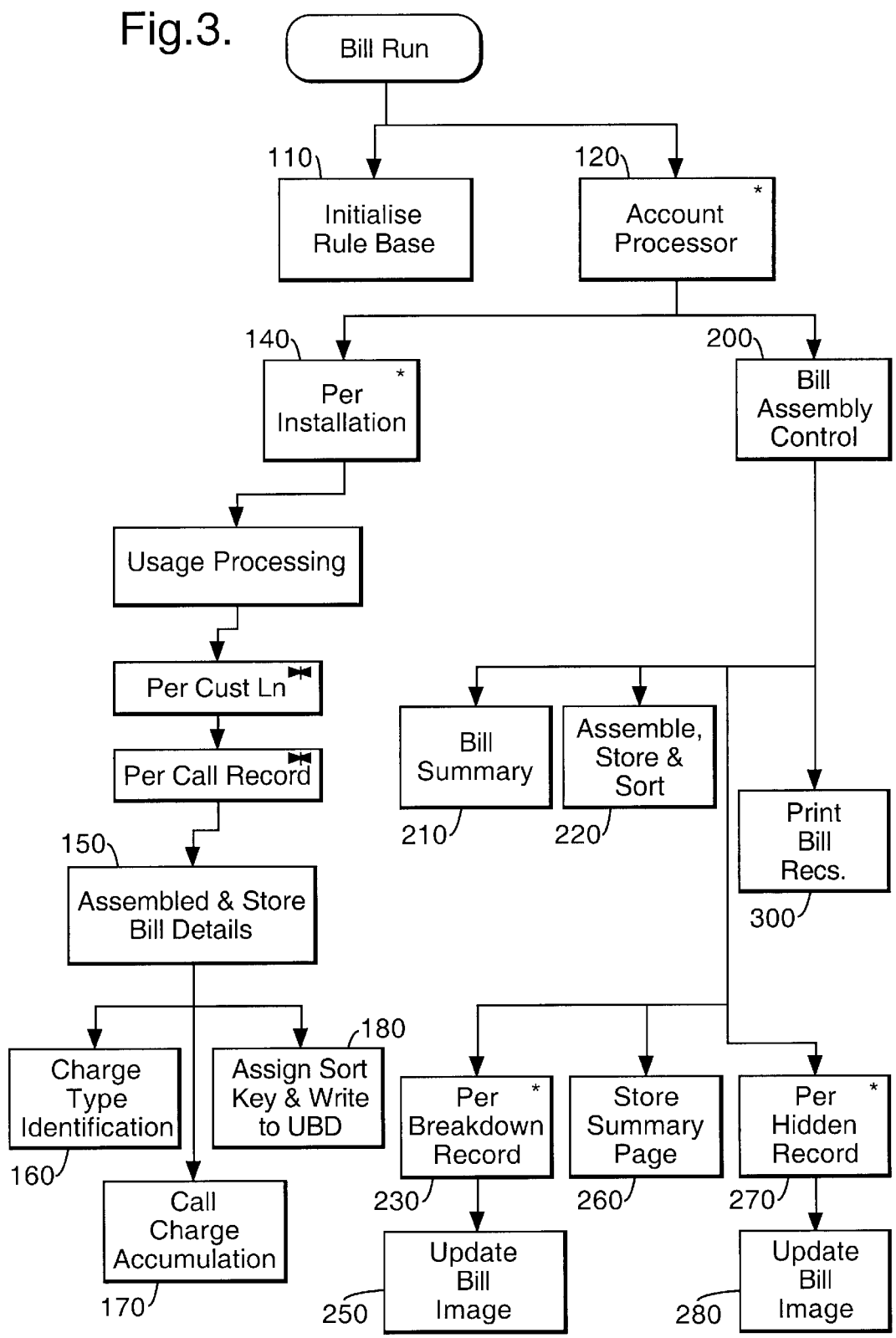
FIG. 3 is the tree of FIG. 2 highlighting processes of the bill generation system specific to the assembly of a bill.

FIG. 3 is the tree of FIG. 2 highlighting processes of the bill generation system specific to the assembly of a bill.

An example of a group of usage records which are passed to process 150 is shown below (the name of the fields are shown for clarity):

| MAINLINE-ID | Descriptor | COST OF CALL | DEST NO. | DATE OF CALL | TIME OF CALL | CALL LENGTH | NET-SV-ID |
|---|---|---|---|---|---|---|---|
| 01232123456 | DD local call | 1.352 | 0123220143 | 19980101 | 120000 | 01132300 | 0123294364 |
| 01232123456 | DD local call | 0.400 | 0123221123 | 19980101 | 120500 | 00014300 | 0123294364 |
| 01232223456 | DD local call | 0.199 | 0123221123 | 19980102 | 120500 | 00020000 | 0123294364 |
| 01232123456 | DD local call | 1.352 | 0123220143 | 19980102 | 120000 | 01132300 | 0123294364 |
| 01232123456 | DD local call | 0.400 | 0123221123 | 19980102 | 120500 | 00014300 | 0123294364 |
| 01232123456 | DD local call | 1.352 | 0123220143 | 19980101 | 120000 | 01132300 | 0123294365 |
| 01232123456 | DD local call | 1.352 | 0123220143 | 19980102 | 120000 | 01132300 | 0123294365 |
| 01232123456 | DD local call | 0.400 | 0123221123 | 19980102 | 120500 | 00014300 | 0123294365 |
| 01232123456 | DD regional call | 1.352 | 0176271122 | 19980101 | 120000 | 01132300 | 0123294364 |
| 01232123456 | DD international call | 0.500 | 03993234234 | 19980101 | 120000 | 00113300 | 0123294364 |
| 01232123456 | DD local call | 0.400 | 0123221123 | 19980101 | 120500 | 00014300 | 0123294365 |
| 01232123456 | DD international call | 1.052 | 04212124732 | 19980101 | 120500 | 01132300 | 0123294364 |
| 01232223456 | DD local call | 0.16 | 0123220143 | 19980101 | 120000 | 00025900 | 0123294364 |
| 01232223456 | DD local call | 1.065 | 0123221123 | 19980101 | 120500 | 00015600 | 0123294364 |

-continued

| MAINLINE-ID | Descriptor | COST OF CALL | DEST NO. | DATE OF CALL | TIME OF CALL | CALL LENGTH | NET-SV-ID |
|---|---|---|---|---|---|---|---|
| 01232123456 | DD regional call | 0.300 | 012471982 | 19980101 | 120500 | 00014300 | 0123294364 |
| 01232223456 | DD local call | 16.06 | 0123220143 | 19980102 | 120000 | 00020000 | 0123294364 |

The MAINLINE-ID field contains the telephone line number to which the call should be assigned for charging whilst the NET-SV-ID contains the number from which the call was made. The abbreviation DD stands for "direct dialled".

A set of rules loaded in process 110 from the external database are used in process 160 to determine which of the set of CTIs should be assigned to each respective usage record. The rules associate the usage records with CTIs such that an assigned CTI uniquely identifies the type of the usage record. Some examples of CTIs are shown below:

| Charge type | CTI |
|---|---|
| Friends & Family service charge | 34 |
| Direct dialled local call itemised | 35 |
| Direct dialled regional call itemised | 36 |
| Direct dialled national call itemised | 37 |
| Direct dialled international call itemised | 38 |
| Direct dialled other call itemised | 39 |
| Call diversion local facility fee | 46 |
| Ring back when free national facility fee | 56 |
| Call diversion-local call | 71 |
| Ring back when free - national | 83 |
| Operator call local | 102 |
| Operator call international | 104 |
| Chargecard call international | 105 |
| Chargecard call local | 106 |
| Chargecard call national | 107 |

Each usage record is processed in turn using data from, in particular, the DEST No (number called) field and NET-SV-ID field. Non-telephone call usage records are processed using other fields (not shown in the above example). Starting at rule 1 below, the type of charge is identified using the Descriptor field of the record. For each permitted answer, there is an associated output from the rule. The output consists of an element of a charge identifier and a next action in the form of the next rule to be parsed or a command to exit as processing has either been completed or an exception has been raised. In parsing the rules for the first record shown above, rule 1 determines that the record relates to a direct dialled call and outputs a 1 before proceeding to parse rule 2. It is determined that the call was not made using a cardphone and a 2 is output and rule 3 is parsed. According to the customer's requirements and default system settings, this type of charge may be bulked, that is individually itemised on the customer's bill, and a 2 is output, continuing on to parse rule 4. Again, customer requirements and default settings indicate that itemisation may be required for this type of charge and a 1 is output and rule 5 is parsed. Comparing the contents of the COST OF CALL field to the itemisation threshold stored in a database associated with the customer, it is determined that the cost of the call is greater than the threshold and a 1 is output, proceeding to parse rule 6. It is determined that the charge does not relate to an international call, a 2 is output and rule 7 is parsed. In rule 7, the call distance is determined to be local, a 1 is output and the system exits parsing for this record.

| Rule | Permitted Answers | Output from Rule |
|---|---|---|
| (1) What type of call is it | Direct dialled | 1 - go to rule 2 |
| | Network Service (NS) facility fee | 2 - go to rule 8 |
| | NS call | 3 - go to rule 8 |
| | NS fee non-call | 4 - go to rule 11 |
| | Other | STOP BILL RUN |
| (2) Is this a cardphone call | Cardphone | 1 - go to rule 3 |
| | Other | 2 - go to rule 3 |
| (3) Is bulking required | No | 1 - go to rule 6 |
| | Possibly | 2 - go to rule 4 |
| (4) Is itemisation required | Possibly | 1 - go to rule 5 |
| | No | 2 - go to rule 6 |
| (5) Is the call cost greater than the itemisation threshold | Yes | 3 - go to rule 6 |
| | No | 2 - go to rule 6 |
| (6) Is this an international call | Yes | 1 - go to exit |
| | Other | 2 - go to rule 7 |
| (7) What is the call distance | Local | 1 - go to exit |
| | Regional | 2 - go to exit |
| | National | 3 - go to exit |
| | Other | 4 - go to exit |
| (8) Is this an international call | Yes | 1 - go to rule 10 |
| | Other | 2 - go to rule 9 |
| (9) What is the call distance | Local | 1 - go to rule 10 |
| | Regional | 2 - go to rule 10 |
| | National | 3 - go to rule 10 |
| | Other | 4 - go to rule 10 |
| (10) What is the network service type | Charge advice | 1 - go to exit |
| | Call diversion | 2 - go to exit |
| | 3 way call | 3 - go to exit |
| | Ring back when free | 4 - go to exit |
| | | 5 - go to exit |
| (11) What is the network service type | Call return | 1 - go to exit |
| | Call trace | 2 - go to exit |
| | Reminder call | 3 - go to exit |
| | Call diversion | 4 - go to exit |
| | Ring back when free | 5 - go to exit |
| | Other | 6 - go to exit |

In the above example, the value 1221121 is output from the rule parsing. This is cross referenced with the table below to give a CTI of 35.

| Charge type | Output from rules | CTI |
|---|---|---|
| DD local calls itemised | 12121 1221121 | 0035 |
| DD regional calls itemised | 12122 1221122 | 0036 |
| DD national calls itemised | 12123 1221123 | 0037 |
| DD international calls itemised | 1211 122111 | 0038 |
| DD other calls itemised | 12124 1221124 | 0039 |
| Call diversion call local facility fee | 2212 | 0046 |
| Call diversion call national facility fee | 2232 | 0056 |

-continued

| Charge type | Output from rules | CTI |
|---|---|---|
| Call diversion call local | 3212 | 0071 |
| Ring back when free call national | 3234 | 0083 |

As each usage record is processed in process 170 the total charge to the customer is accumulated.

In process 180, a sort key for each usage record is generated according to the following criteria:

sort section key—overall ordering within the bill based on the record's CTI
mainline key—the telephone number to be processed
sort subsection key—ordering within a subsection of a bill based on the record's CTI
calling line ID—the telephone number from which the call was made
call date—the date on which the call was made
call time—the time at which the call was made These criteria form part of the rules loaded in process 110.

For example, the above usage records would be respectively assigned the following sort keys:

```
(sort section | main line | sort subs | calling line | date | time)

3 | 01232123456 | 18 | 0123294364 | 19980101 | 1200
3 | 01232123456 | 18 | 0123294364 | 19980101 | 1205
3 | 01232123456 | 18 | 0123294364 | 19980102 | 1200
3 | 01232223456 | 18 | 0123294364 | 19980102 | 1205
3 | 01232123456 | 18 | 0123294364 | 19980102 | 1205
3 | 01232123456 | 18 | 0123294365 | 19980101 | 1200
3 | 01232123456 | 18 | 0123294365 | 19980101 | 1205
3 | 01232123456 | 18 | 0123294365 | 19980102 | 1205
3 | 01232123456 | 20 | 0123294364 | 19980101 | 1200
3 | 01232123456 | 22 | 0123294364 | 19980101 | 1200
3 | 01232123456 | 18 | 0123294364 | 19980102 | 1200
3 | 01232123456 | 22 | 0123294364 | 19980101 | 1205
3 | 01232223546 | 18 | 0123294364 | 19980101 | 1200
3 | 01232223456 | 18 | 0123294364 | 19980101 | 1205
3 | 01232123456 | 20 | 0123294364 | 19980101 | 1205
3 | 01232223456 | 18 | 0123294364 | 19980102 | 1200
```

Each usage record and its assigned CTI and sort key is stored in the UBD. Some usage records, for example for chargecard calls, may take much longer to reach the service provider than those for a local call and could therefore be out of time order sequence. The usage record may even be from a previous billing period.

Process 210 generates a bill summary for the customer. The summary contains the customer account number and address for billing as well as the total charges accumulated in process 170 less any applicable discounts.

In process 220 the UBD are sorted numerically by the assigned sort keys to produce a sorted bill details (SBD) which are stored in a SBD database. The SBD are parsed in processes 230 and 250 to generate an electronic bill image containing the records to be printed from the SBD, formatting codes relating to how lines of the bill should be printed and text codes indicating other information that should appear on the bill. These processes are described in more detail with reference to FIG. 4. Process 260 takes the bill summary produced in process 210 and adds it to the electronic bill image.

Processes 270 and 280 add the records from the SBD and other customer data to the electronic bill image that, whilst not printed on the bill, would be needed for reference in determining how the bill was generated or when amending the bill. Non-itemised usage records are assigned a different CTI to itemised usage records which results in them not being individually displayed on the bill. Process 270 passes each hidden record of the SBD to process 280 which adds it to the electronic bill image on a hidden page which is not printed by process 300. Other types of hidden records added here are discussed in further detail with reference to FIG. 6.

The electronic bill image is then passed to process 300 for printing and dispatch to the customer.

Process 300 reads each line of the bill image and, using data tables loaded in process 110, converts the records and codes into lines of formatted text and places it into a print file. The data tables contain details on the font, text size and format of a line according to its CTI. The data tables also contain cross references from text codes to textual description lines to be added to, around, before, or after a bill image line.

For example, a bill image record may be of the form:

CTI 34|£2.00|TextCode00123

Process 300 retrieves the text relating to code 00123 ("You have chosen to opt for Friends & Family and you will be charged <VAL> per month"), the format relating to CTI 34 (Times New Roman 10 italics bold) and output the following to the print file:

*You have chosen to opt for Friends & Family and you will be charged £2.00 per month*

The entries in the data tables for hidden records, the hidden attribute being specified by their respective CTI, instruct process 300 to ignore these records. Once each line of the bill image has been processed, the print file is sent to a printer to be output. An example of a print file to be output is shown below:

Regional & national calls
Regional & national calls over £0.50 (itemised)

| Date | Time | Destination | | Number of calls | Duration (hrs:mins:-secs) | Cost before discount (£) |
|---|---|---|---|---|---|---|
| Line number 894100 | | | | | | |
| 3 Nov | 10:30 | Ipswich | 01473 320143 | | 01:13:23 | 1.352 |
| 10 Nov | 11:36 | Ipswich | 01473 321123 | !SA-VER!! | 00:01:43 | 0.563 |
| Subtotal for line 894100 | | | | | 01:15:06 | 1.915 |
| Line number 894425 | | | | | | |
| 11 Nov | 10:30 | Ipswich | 01473 320143 | | 01:13:23 | 1.352 |
| Subtotal for line 894425 | | | | | 01:13:23 | 1.352 |
| Total regional & national calls | | | | | 02:28:29 | 3.267 |
| over £0.50 (itemised) | | | | | | |
| Total regional & national calls | | | | 152 | 03:01:59 | 18.968 |

| International calls | | | | | |
|---|---|---|---|---|---|
| International calls over £0.50 (itemised) | | | | | |
| Date | Time | Destination | Number of calls | Duration (hrs:mins:-secs) | Cost before discount (£) |
| Line number 894100 | | | | | |
| 3 Nov | 10:30 | France | 33345434436 | !SA-VER!! | 00:06:23 | 1.352 |
| 3 Nov | 11:36 | USA | 12124523445 | USA-PLAN | 00:03:43 | 0.563 |
| Subtotal for line 894100 | | | | 00:10:06 | 1.915 |
| Line number 894425 | | | | | |
| 11 Nov | 10:30 | France | 33342320143 | | 01:13:23 | 1.352 |
| 16 Nov | 11:36 | USA | 13122346532 | !SA-VER!! | 00:01:43 | 0.563 |
| Subtotal for line 894425 | | | | 01:15:06 | 1.915 |
| Total international calls over £0.50 (itemised) | | | | 01:25:12 | 3.830 |

Figure 4:
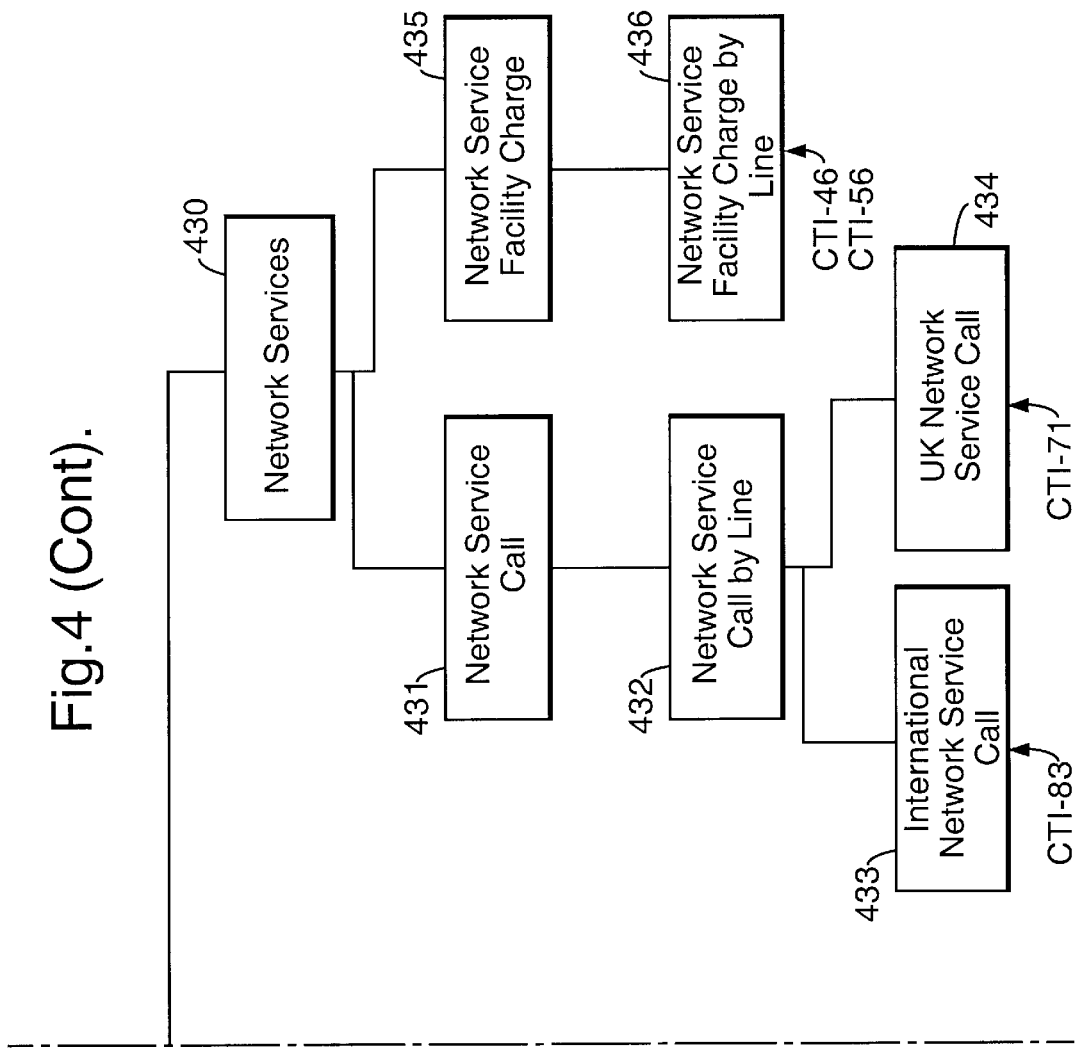
FIG. 4 is a portion of a text map used in the bill generation system in accordance with the present invention.

FIG. 4 depicts a portion of a tree of a text map used in the generation and formatting of an electronic bill image. The tree defines the relationships between sections of the bill, such that each node of the tree represents a section. The hierarchy of the tree is such that lower level nodes represent subsections of higher level nodes. Each CTI is mapped to a leaf node in the tree. CTI mappings shown in FIG. 4 are expressed in the form CTI-XXX, where XXX is the CTI number.

The following structure is populated for each usage record processed:

CURRENT USAGE RECORD CTI HEADING ARRAY
CURRENT SECTION ID TRIGGER VARIABLES ARRAY

For each usage record, its immediate heading is obtained by following the mapping of the usage record's assigned CTI to a leaf node which defines the heading for that CTI type. The identifier of that heading is written to the first element of the heading array. From this leaf node, the heading identifier of the parent section is obtained by following the branch of the leaf node up one level in the tree. This is stored in the second element of the array, and so on up the tree until the root is reached.

In one example, an SBD having usage records with respective CTIs of 35, 35, 37 and 56 is passed to process 250. CTI 35 is mapped to leaf 412 in the tree. Following the branch up the tree and recording the identifiers of each node passed, the first and second records generate a heading branch array of [400 410 411 412]. In a similar manner, the third record generates a heading branch array of [400 410 414 415] and the last record generates a heading branch array of [400 430 435 436].

For each CTI, one or more trigger variables may also be stored, each variable can trigger the output of a section header at any one of the heading identifiers in the heading array structure. A change of value of trigger variable causes new section information to be written to the electronic bill image for that section. A trigger variable may be, for example, a change in the telephone line to be displayed. If a bill is to be generated for 2 or more telephone lines, each may have usage records for direct dialled local calls (each record will have the same CTI) and these may be outputted to the bill image in the same section. However, the CTI for direct dialled local calls may have a trigger variable of change in line, in which case when the line identifier changes, a header and possibly a footer may be outputted to the current section of the electronic bill image to differentiate between charges from the different lines. Trigger variables are obtained from a trigger table loaded by the system in process 110 and stored in the trigger variable array.

Once the arrays have been determined, process 250 determines whether any header or footer information in the form of text codes need to be output. Firstly, the heading identifier for the first entry in each of the current and previous charge structures is compared. If these values are the same, the corresponding trigger variables stored against those heading identifiers are compared. This is repeated for each heading identifier value and trigger variable until a change is noticed, at which point the level of change is recorded. If no change occurs, then no change in header information is required and the usage record can be output to the bill image directly.

Once a change is detected at a certain heading level, the footers belonging to the previous charge down to and including the change point given by the previous section are output to the bill. This is then followed by the headers belonging to the current charge up from and including the changed level.

An example of the processing of the above arrays for generating an electronic bill image is illustrated schematically in FIGS. 5a to 5e.

The electronic bill image illustrated in FIG. 5a is generated by processing the first record and its corresponding array. Headers opening respective sections 400, 410, 411 and 412 are output, followed by the first record 550. As the array of the first and second records do not differ, on processing the second record and its array, only the second record 560 is output to the electronic bill image as is illustrated in FIG. 5b.

In processing the third record, its corresponding array differs at the third and fourth element [400 410 414 415]. This difference causes sections 411 and 412 to be closed by outputting footers before headers opening respective sections 414 and 415 are output. The third record 570 is then output to the electronic bill image, as illustrated in FIG. 5c.

The array corresponding to the last record differs from the previous record at the second element [400 430 435 436]. This difference causes sections 410, 414 and 415 to be closed by outputting footers prior to headers opening respective sections 430, 435 and 436 being output. The last record 580 is then output to the electronic bill image, as illustrated in FIG. 5d. As there are no more records to process, the remaining open sections 400, 430, 435 and 436 are closed by outputting footers completing generation of the bill image, as illustrated in FIG. 5e.

In the above process, the heading arrays need not be generated all at once and could be generated one at a time as the electronic bill image is being created as long as a copy of the previous header array was retained for use in determining differences in heading sections.

In the example described above the term "usage record" is applied to call records. However, the invention may be applied to other forms of usage records relevant to, for example, discounting products (see below), and rental charges for equipment or other facilities.

Figure 6:
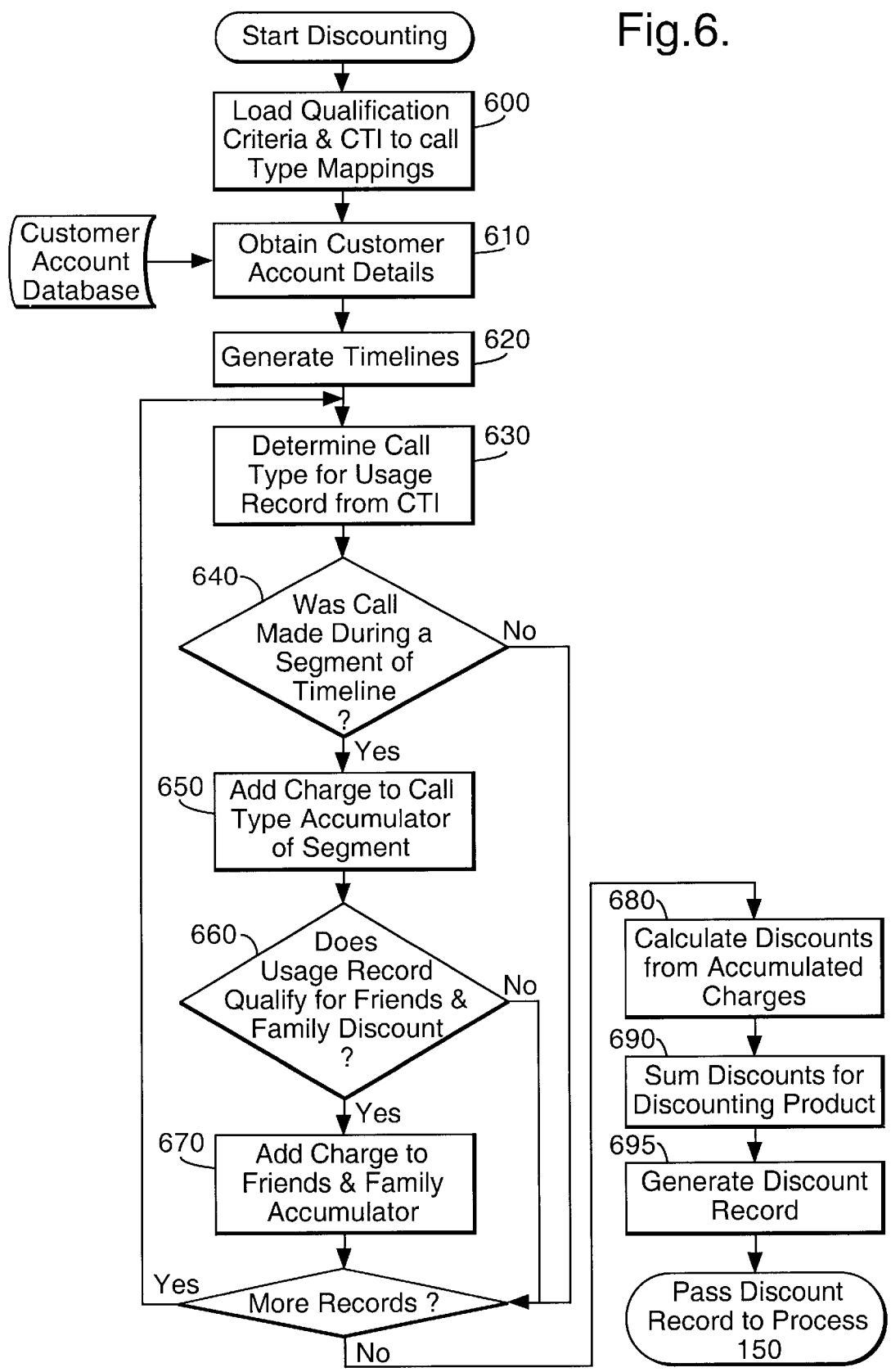

FIG. 6 is a flow chart in which processes 100, 130, 170 and 190 of the bill generation system specific to applying discounts and the like are described in further detail.

Each discounting product will have one or more qualification criteria defined. For example, for PremierLine provided by British Telecommunications plc most call charges qualify for a discount (charges for calls to mobile telephones or premium rate numbers are normally excluded), whilst for Friends & Family provided by British Telecommunications plc, only call charges on calls to a group of selected numbers qualify for a discount. The qualification criteria for each discounting product are loaded into the system in step 600 from an external data store (process 100). A CTI to call type mapping is also loaded from an external data store in step 600.

In order to allow discounting products to be applicable for only a part of a billing period, discounting products subscribed to by the customer and the dates on which they were active during the billing period are stored in a customer account database.

When first starting to process a customers account, the customer account database is accessed and the discounting products subscribed to, and the dates on which they were active for the customer, are obtained in step 610 (process 130).

If a customer is a member of Friends & Family, the customer's selected set of numbers are obtained from the customer account database and are added to the qualification criteria for the Friends & Family discounting product.

Using the data from the customer account database, a time line for each discounting product subscribed to is generated in step 600. A timeline consists of one or more segments, each segment representing a period in which the discounting product was active and unchanged, i.e. the discount rate or circumstances in which discounts apply do not change. Each segment has a number of accumulators for storing charges of usage records that qualify for the discounting product during the time period of the segment.

The structure of each segment of a time line is dependent on the discounting product. For Friends & Family, each segment has an accumulator for each number from the customer's selected group, whilst for the other products each segment has a number of accumulators, one for each of a fixed number of call types, in which details of any qualifying usage record for that segment are stored. The accumulators are created in process 130, as previously discussed with reference to FIG. 2.

Figure 7A:
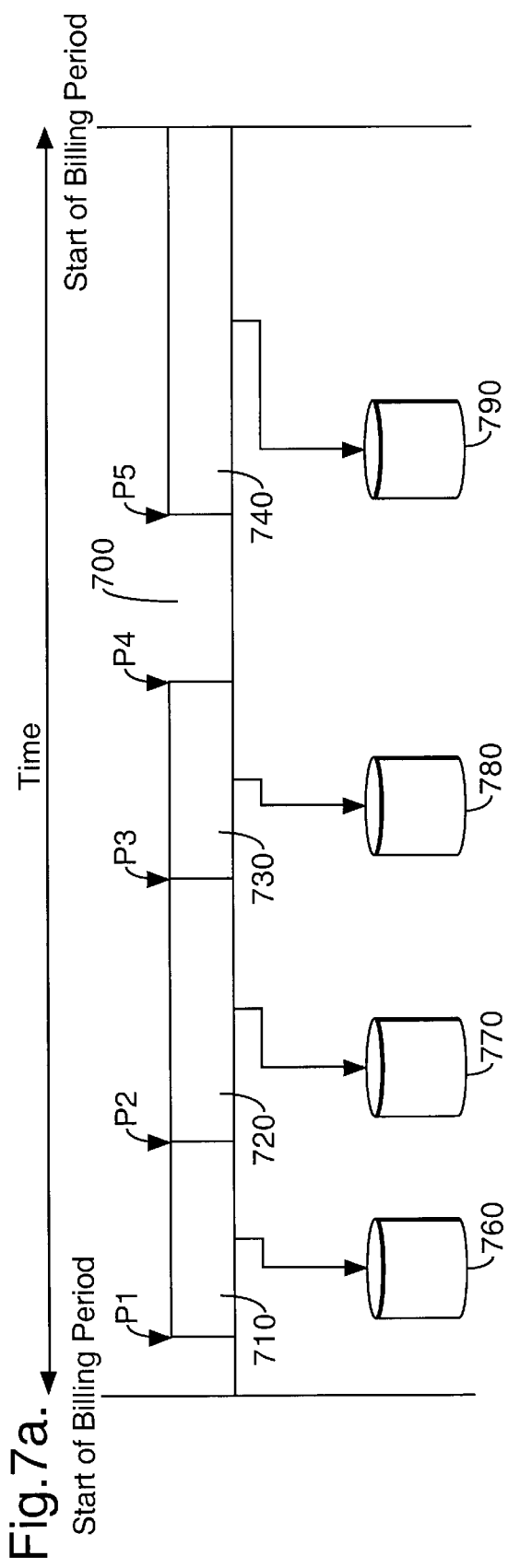
FIGS. 7a and b illustrate time lines generated for applying discounts to usage records.

FIG. 7a illustrates an example of a time line generated for a discounting product in which a customer subscribes to the product part way through a billing period and a number of changes to the product are also made. Prior to obtaining data on the discounting product, the dates of the usage records in the UBD are checked to determine whether any record is from a previous billing period. If so, the billing period, for the purposes of generating time lines is extended to incorporate the date(s) of these records. The customer account database is accessed and the period(s) of the billing period during which the product was actually subscribed to are determined. A central discount product definition database is also accessed that contains data defining the product. Any changes made to the product during the billing period are obtained. A time line data structure 700 is generated consisting of one or more segment data structures 710–740. The time line data structure 700 is preferably formed as a linked list of segments, each segment representing a part of the billing period during which the discounting product was subscribed to by the customer and during which the product was not changed. A number of accumulator data structures, each represented by a single data store 760–790, are linked to each segment data structure. In the example of FIG. 7a, the customer subscribes to the product at point P1 generating segment 710, the discount rate applicable to the discounting product is changed at point P2 generating segment 720, the customer changes options of the discounting product at point P3 generating segment 730, the customer cancels the subscription to the product at point P4 and resubscribes at point P5 generating segment 740.

Referring to FIG. 6, as each usage record is processed, a call type for each usage record is determined in step 630 by cross-referencing its CTI with the table mapping CTI to call type loaded into the system in process 100 from an external data store. There may be a number of CTIs mapped to a single call type, for example the CTIs for local, regional, national and international direct dialled calls may be mapped to the call type direct dialled calls. The table also contains a flag for each call type indicating whether a call type for the destination number of the usage record should be determined. If the flag is set then step 630 also determines a call type for the destination number of the usage record.

In step 640, for each discounting product in which each segment has a number of accumulators, one for each call type, the date and time the call was made or the service type used is checked against the segments of the time line. If the date and time falls within one of the segments, the charge of the usage record is added to the appropriate accumulator for that segment in step 650. For a discounting product such as Friends & Family each segment is divided into the numbers selected for Friends & Family, each of which will have an accumulator. In the step 660, the usage record is checked to determine if the call charge qualifies for a Friends & Family discount. If the number to which the call is made is one of the Friends & Family group, the call charge is added to the appropriate accumulator in step 670. Depending on the discounting products that are applicable to the customer, a call charge may be added to a number of accumulators each associated with different products. Steps 630 to 670 occur in process 170, described with reference to FIG. 2.

Figure 7B:
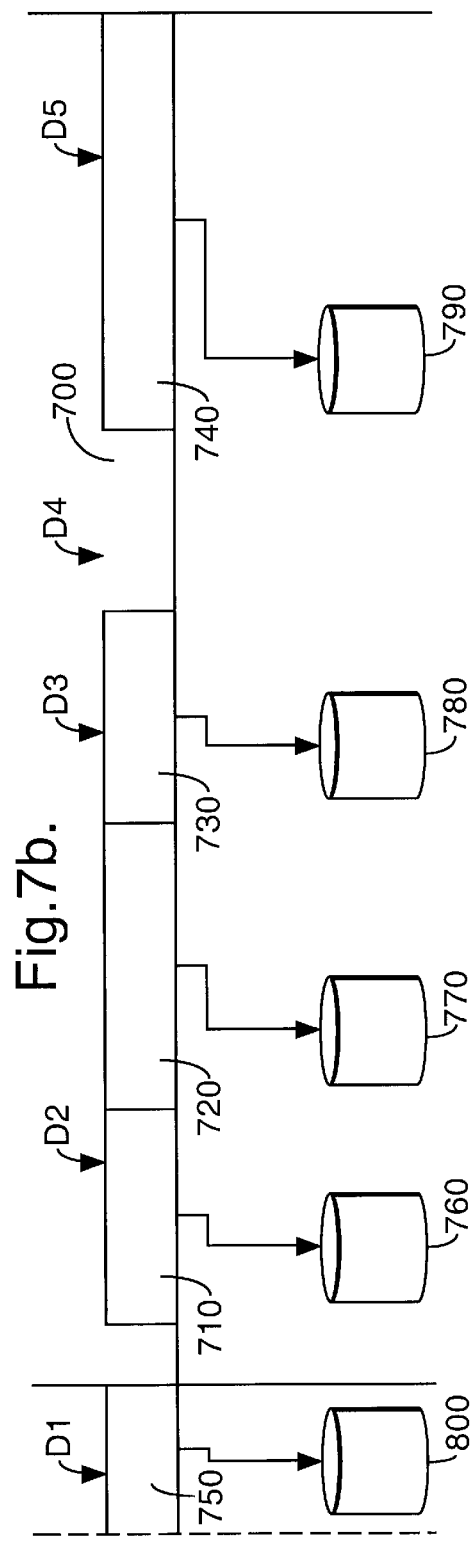

FIG. 7b expands on the example of FIG. 7a illustrating a number of usage records that qualify for the discounting product, the usage records having respective dates D1–D5. Date D1 occurs prior to the start of the billing period and the time line for the billing period is therefore artificially expanded to include this date according to data in the customer account database and the discounting product definition database. From the data it is determined that the customer had subscribed to the discounting product during the period of date D1 resulting in segment 750 and linked accumulator data structure 800 being generated.

The date of each usage record is compared with the time line data structure and if the date coincides with the period of one of the segments, the charge held in the usage record is added to the accumulator linked to that segment. In this example, the date D1 coincides with the period of segment 750 and the charge of the associated record is added to accumulator 800, and so on. The date D4 does not coincide with the period of any segment and therefore that usage record is not applicable for a discount from the discounting product and is ignored.

Referring again to FIG. 6, after all the usage records have been processed discounts are calculated from the accumulated charges. For all discounting products other than Friends & Family, this is calculated by determining the call types that qualify for the discount product and applying the correct discount rate to the sum stored in each accumulator of qualifying call types in step 680. For Friends & Family, the amount of discount is determined in step 680 by applying the discount rate associated with each of the customer's selected destination numbers to the accumulated usage. In either case, for each discount calculated, a discount record is generated in step 690 in which the discount and any other details necessary to be displayed to the customer on their bill are stored. Steps 680 to 690 occur in process 190, described with reference to FIG. 2.

Each discount record generated is then passed to process 150 to have a CTI and sort key assigned and to be added to the UBD. Process 170 is skipped when process 150 is called from process 190.

An example of a number of discount records passed to process 150 is shown below:

| Field | Rec 1 | Rec 2 | Rec 3 |
|---|---|---|---|
| Option Number | 90010 | 90010 | 90010 |
| Option Description | Super Saver | Super Saver | Super Saver |
| Report start date | 19981220 | 19981220 | 19981220 |
| Report end date | 20000208 | 20000208 | 20000208 |
| Line start date | 19981220 | 19990101 | 19981220 |
| Line end date | 19981231 | 20000208 | 20000208 |
| Call Type | 102 | 102 | 104 |
| Call Type Name | Direct Dialed | Direct Dialed | Network Services |
| Gross cost of call (£) | 100.00 | 20.00 | 50.00 |
| Discount rate (%) | 12.00 | 11.00 | 5.00 |
| Discount amount (£) | 12.00 | 2.20 | 2.50 |

The hidden records relating to the discounting system added to the electronic bill image by process 270 include a record for each discounting product containing the data used to generate the product's respective time line and a record for each product containing a copy of each segment and linked accumulator(s). For a product such as Friends & Family, the customer's chosen discounted numbers are also stored in a hidden record. Finally, a hidden record containing customer information not held elsewhere in the bill image is added to the bill image. Each type of hidden record has its own unique CTI assigned.

Figure 8:
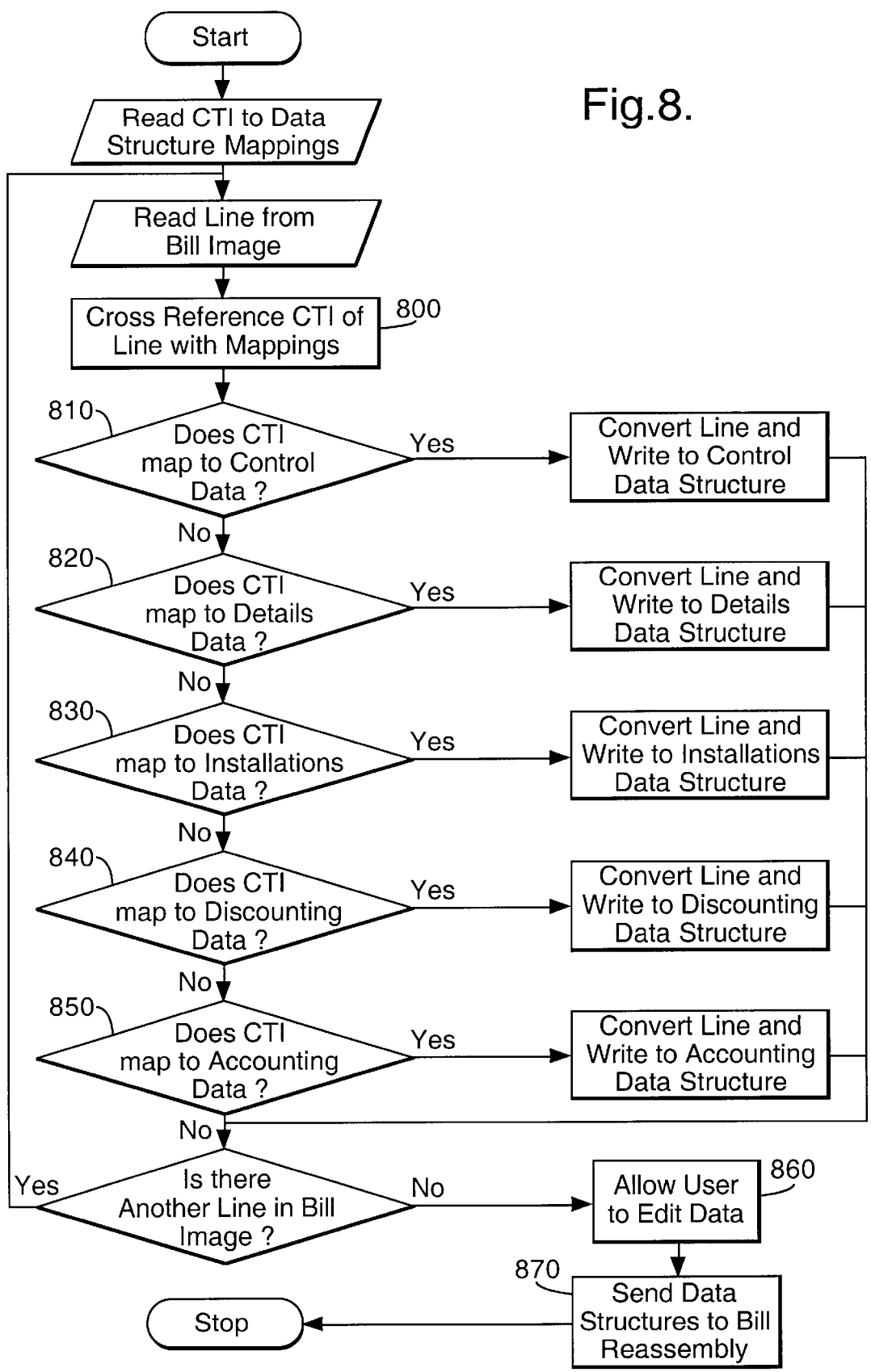
FIG. 8 is a flow chart of processes performed in disassembling and editing an existing bill image in accordance with the present invention; and, FIG. 9 is the tree of FIG. 2 highlighting processes of the bill generation system used in reassembling bill images.

FIG. 8 is a flow chart of processes performed in disassembling and editing an existing bill image.

A bill image to be edited is disassembled into a number of records, each record representing a particular entry in the bill image. These records can then be edited by a user through a menu interface. The edited records are then used by portions of the bill generation system of FIG. 1 to reassemble the bill image reflecting any changes made by the user.

Each line of a bill image selected to be edited is processed to populate the following data structures:

Control—holds data that appears on the bill once only including customer address, summary page totals, customer account number and bill serial number.
Details—holds usage records.
Installations—holds details of the installations that appear on a bill. Details include installation class (i.e. payphone, cardphone, business etc) and number of lines for installation.
Discounting—holds details of all discounting products relating to the account.
Accounting—holds the total charge before discounts displayed on the bill image summary page.

The CTI field of each line is cross-referenced with a table giving mappings of CTIs to the relevant data structure(s) in step 800. The mappings associate each CTI with one of the above data structures and also contain rules used to convert the data from the bill image lines to the data structures. The mappings are used to export each line of the bill image to a record in the relevant data structure(s) in steps 810–850.

An example of a record generated in the details data structure from a direct dialled call line in the bill image is as follows:

| Field description | Value |
|---|---|
| Charge Type Identifier | 35 |
| Phone number of the installation from which the call is made. | 01232 12345 |
| Phone number of the line from which the call is made | 01232 12345 |
| Call chargeband (local, national, international or other) | L |
| Date call was made | 1-Nov-1998 |
| Time call was made | 18:03 |
| The phone number of the destination being called | 01232 84000 |
| The exchange name associated with the destination being called | Belfast |
| the duration of the call | 1:15 |
| the number of call units associated with the call | 10 |

The menu interface allows the records of the data structures to be edited in step 860. Using this interface, usage records can be altered, deleted or inserted; details of discounting products and dates on which they are subscribed to can be changed; and details of the customer and installation can be changed. Any change to the charge value of a usage record is reflected by an equivalent change to the total charge held in the accounting data structure.

Once editing is complete, an option in the menu interface allows the user to order the reassembly of the bill image from the data structures in step 870.

Figure 9:
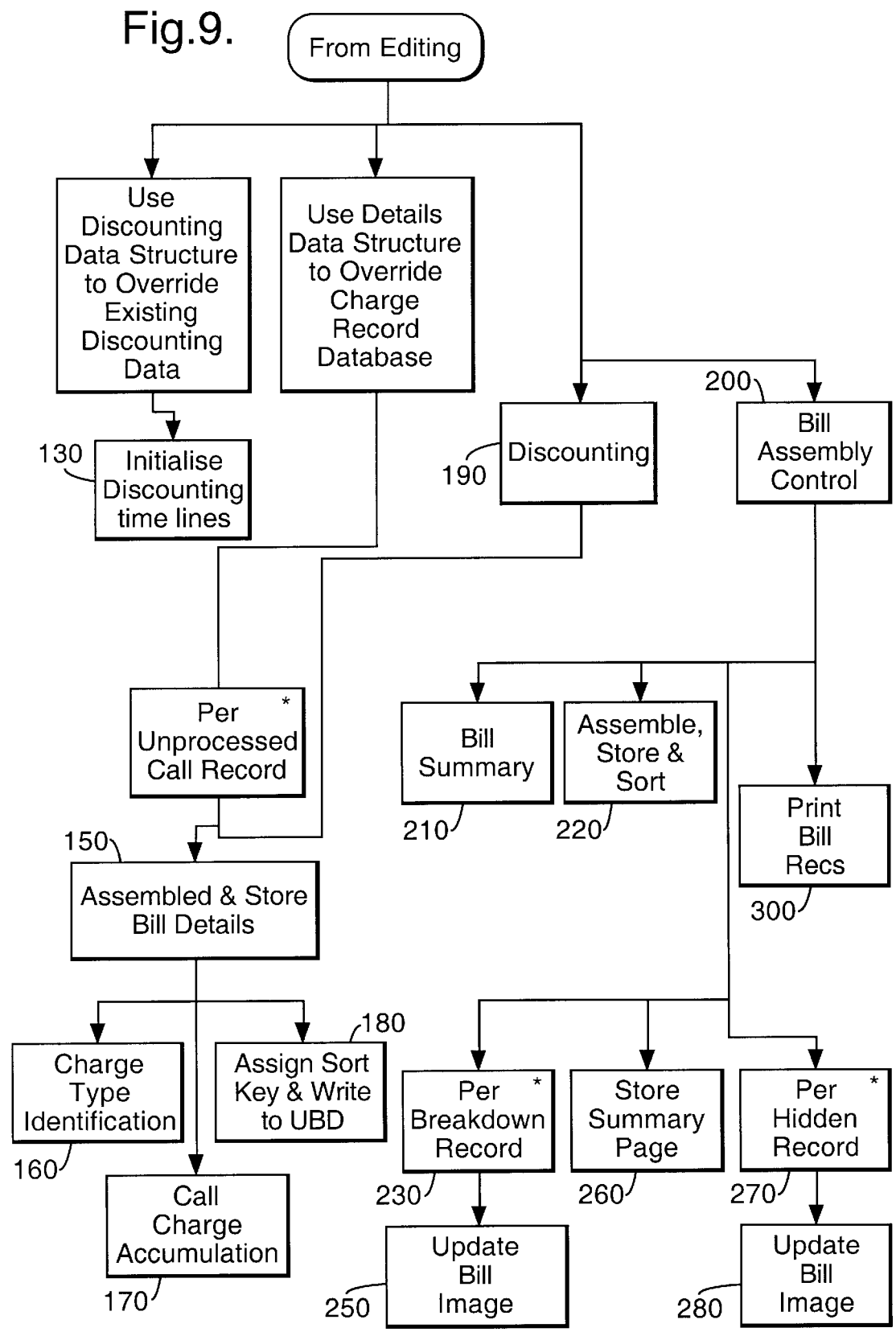

FIG. 9 is the tree of FIG. 2 in which the processes used in reassembling bill images are highlighted.

For each record of the details data structure, a usage record is created. The CTI and sort key held for each record is copied to the usage record. The usage records are then assembled into a UBD. Any new usage records inserted using the menu interface must have a CTI and sort key assigned by being passed to processes 150–180.

The data contained in the discounting data structure is used in process 130 to initialise discounting time lines and the total charge value held in the accounting data structure is used to replace the call charge that would be accumulated by process 170. The UBD is then passed into the system at process 190 and a new bill image is generated for the amended records according to processes 200–300.

What is claimed is:

1. A method of generating a bill image for a customer in a computer implemented billing system for a telecommunications network which includes discounts for a customer applied to calls made during a billing period in which a plurality of discount scheme apply, including:

loading qualification criteria for the discount schemes and customer account details into the billing system;
generating a data structure for each discount scheme, the data structures defining a time line over at least part of which the discount scheme was operative, the time line being divided in dependence on subscription to the discount scheme by the customer and on changes to the discount scheme during the billing period into a number of segments each of which corresponds to a period during which a respective version of the discount scheme was operative;
accumulating charges for the calls made during each segment; and
subsequently calculating an appropriate discount from the accumulated charges for each segment for calls which qualify for a discount under the said discount scheme;

wherein generating the time line further includes determining the date of the earliest made call of the calls made and, if the date falls before the start of the billing period, extending the billing period to include the date of the call.

2. A method according to claim 1, wherein accumulating the charges for the calls made during each segment includes accumulating the charges for calls made in each of a number of predetermined categories.

3. A method according to claim 2, characterised in that the charges for the calls are accumulated by call type.

4. A method according to claim 2, characterised in that the charges for the calls are accumulated in dependence on the called number.

5. A method according to claim 2, characterised in that the step of calculating the appropriate discount includes obtaining an appropriate discount rate associated with the respective version of the discount scheme for the predetermined category for which the charges have been accumulated and applying the discount rate to the accumulated charges.

6. A method according to claim 1, further including generating a discount usage record containing the calculated discount for use in the generation of the bill image.

7. A computer implemented billing system characterised in that the system is arranged to perform the following operations to generate a bill image which includes discounts for a customer applied to calls made during a billing period in which a plurality of discount scheme apply:

generate a data structure for each discount scheme defining a time line over at least part of which the discount scheme was operative, the time line being divided in dependence on subscription to the discount scheme by the customer and on changes to the discount scheme during the billing period into a number of segments each of which corresponds to a period during which a respective version of the discount scheme wad operative, the time line including the date of the earliest made call of the calls made and, if the date falls before the start of the billing period, extending the billing period to include the date of the call accumulate charges for the calls made during each segment, and calculate an appropriate discount from the accumulated charges for each segment for calls which qualify for a discount under the discount scheme.

8. A method of generating a bill image for a customer in a computer implemented billing system for a telecommunications network, the billing system being capable of applying a plurality of discount schemes retrospectively at the end of a billing period, each discount scheme including a plurality of discounts which apply to calls made during the billing period, the method including the steps of, at a predetermined billing date:

loading qualification criteria for each of said plurality of discount schemes and customer account details into the billing system; and for each of said plurality of discount schemes for which the customer is determined to be qualified, generating a data structure which defines a time line over at least part of which a said discount scheme was operative, the time line being divided in dependence on subscription to the said discount scheme by the customer and on changes to the said discount scheme during the billing period into a number of segments, each segment corresponding to a period during which a respective version of the said discount scheme was operative, wherein the date of the earliest made call of the calls made is determined and, if the date falls before the start of the billing period, extending the billing period to include the date of the call;

accumulating charges for the calls made during each segment, and subsequently calculating an appropriate discount from the accumulated charges for each segment for calls which qualify for a discount under the said discount scheme.

9. A method according to claim 8, wherein accumulating the charges for the calls made during each segment includes accumulating the charges for calls made in each of a number of predetermined categories.

10. A method according to claim 9, characterised in that the charges for the calls are accumulated by call type.

11. A method according to claim 9, characterised in that the charges for the calls are accumulated in dependence on the called number.

12. A method according to claim 9, characterised in that the step of calculating the appropriate discount includes obtaining an appropriate discount rate associated with the respective version of the discount scheme for the predetermined category for which the charges have been accumulated and applying the discount rate to the accumulated charges.

13. A method according to claim 8, further including generating a discount usage record containing the calculated discount for use in the generation of the bill image.

* * * * *